(12) United States Patent
Krauss

(10) Patent No.: US 11,151,459 B2
(45) Date of Patent: Oct. 19, 2021

(54) SPATIAL EXCLUSIVITY BY VELOCITY FOR MOTION PROCESSING ANALYSIS

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 923 days.

(21) Appl. No.: 15/444,280

(22) Filed: Feb. 27, 2017

(65) Prior Publication Data

US 2018/0247208 A1    Aug. 30, 2018

(51) Int. Cl.
*G06N 5/02*   (2006.01)

(52) U.S. Cl.
CPC .................................. *G06N 5/022* (2013.01)

(58) Field of Classification Search
CPC ...................................................... G06N 5/022
See application file for complete search history.

(56) References Cited

U.S. PATENT DOCUMENTS

| | | | |
|---|---|---|---|
| 6,229,536 B1 | 5/2001 | Alexander et al. | |
| 6,775,392 B1 | 8/2004 | Rhoads | |
| 9,230,258 B2* | 1/2016 | Adair | H04W 4/029 |
| 9,270,451 B2* | 2/2016 | Jonas | H04L 9/0861 |
| 9,270,870 B2 | 2/2016 | Diggins et al. | |
| 9,338,001 B2 | 5/2016 | Jonas et al. | |
| 9,372,897 B2 | 6/2016 | Krauss | |
| 9,874,587 B1* | 1/2018 | Holcomb | G01R 13/0254 |
| 2010/0177120 A1 | 7/2010 | Balfour | |
| 2012/0084249 A1* | 4/2012 | Adelman | G06F 16/29 706/52 |
| 2013/0044134 A1 | 2/2013 | Waldo | |
| 2014/0278210 A1* | 9/2014 | Krauss | G01B 21/06 702/150 |
| 2014/0278228 A1* | 9/2014 | Agrawal | G01C 21/32 702/157 |

(Continued)

OTHER PUBLICATIONS

Viswanathan et al, "Querying Cardinal Directions between Complex Objects in Data Warehouses", 2011, Fundamenta Informaticae CVII, pp. 1001-1026. (Year: 2011).*

(Continued)

*Primary Examiner* — Michael J Huntley
*Assistant Examiner* — Clint Mullinax
(74) *Attorney, Agent, or Firm* — Samuel Waldbaum, Esq.; McGinn I.P. Law Grou, PLLC

(57) ABSTRACT

A motion processing analysis method, system, and computer program product include selecting a first spatial graticule size, determining that a physical entity is associated with a first spatial graticule during a first timeframe and that the physical entity is associated with a second spatial graticule during a second timeframe, as a result of determining that the physical entity is associated with the first spatial graticule during the first timeframe and that the physical entity is associated with the second spatial graticule during the second timeframe, adding to a sum, determining that the sum is beyond an acceptable range, and as a result of determining that the sum beyond the acceptable range, selecting a second spatial graticule size.

20 Claims, 5 Drawing Sheets

(56) References Cited

U.S. PATENT DOCUMENTS

2016/0210351 A1 7/2016 Krauss
2017/0011279 A1* 1/2017 Soldevila ................. G06N 3/04

OTHER PUBLICATIONS

Mel, et al. "The NIST Definition of Cloud Computing". Recommendations of the National Institute of Standards and Technology. Nov. 16, 2015.
Viswanathan et al.; "The Objects Interactions Graticule For Cardinal Direction Querying In Moving Objects Data Warehouses".2005: 2009.
Knudsen, Thomas; "Practical Experience With Spatial-Temporal GIS In Geophysical Research". Laprs, vol. XXXIII, Amsterdam, 2000.
Ip.com Prior Art Database Technical Disclosure.; "Method And System To Improve Efficiency Of Bounded Spatial Relationships Generated Between Sets Of Spatial Entities", Jun. 20, 2016, Disclosed Anonymously; IPCOM000246587D.

* cited by examiner

SPATIAL EXCLUSIVITY BY VELOCITY FOR MOTION PROCESSING ANALYSIS

BACKGROUND

The present invention relates generally to a motion processing analytics method applicable to a cloud computing environment, and more particularly, but not by way of limitation, to a system, method, and computer program product for entity analytics and for determination of spatial and temporal relationship(s) among physical entities based on motion processing.

Entity analytics systems typically are configured to determine relationships between entities, such as "is a" or "is related to a" relationships. An "is a" relationship exists between two observed entities if the observations reflect an identical entity (i.e., two observations refer to the same entity). Using a ship tracking system as an example, if two observations of oceangoing vessels reflect common positions, crew members, tonnages, registration numbers, etc., the system determines that there is a 1:1 relationship (i.e., an "is a" relationship) between the two entities. An "is related to a" relationship exists between two observed entities if the observations reflect sufficiently common characteristics, but not an exact match. Again, using a ship tracking system as an example, an "is related to a" relationship exists between entities, for example, if two observed entities have similar tonnages, but different positions, crew members, etc.

Typically, entity analytics systems are configured to determine "is a" and "is related to a" relationships between different entities using an entity/feature/feature element model. In the entity/feature/feature element model, an entity may have one or more features, and each feature may have a set of pre-defined elements. Using a ship tracking system as an example, the entity itself may be a ship. The ship may have a plurality of features, such as ship size, crew information, identifying information, and so on. The ship size information may have feature elements corresponding to the maximum tonnage, volume, and so on. The crew information feature may have feature elements corresponding to specific positions or roles on the ship (e.g., captain, helmsman, navigator, etc.). The identifying information may have feature elements corresponding to a registration number, port of registry, and so on. Entity resolution is performed by comparing the features or feature elements of observed entities according to predetermined rules. The comparison of features or feature elements associated with space and time can be performed according to rules for comparing features and/or feature elements applicable to motion processing.

The spatial region in which a physical entity is observed can be considered a feature of that entity that ideally has high exclusivity. The exclusivity of a feature is a measure of how likely two entities with differing values for that feature are likely to be identical or otherwise related. For instance, physical entities such as oceangoing vessels may be found to be related or identical if their observed features, such as geospatial coordinates, are sufficiently similar according to configurable rules. On the other hand, the entities may be found to be unrelated, or not identical, if their observed coordinates are too different or are too far apart according to the rules. Thus, spatial separation between physical entities ideally tends to be exclusive.

Conventional techniques include methods of quantizing space and time in order to determine entity relationships. Other conventional techniques include determining frequent visitors to a particular spatial region or determining whether entities frequently interact with each other by repeatedly occupying identical or proximate spatial and/or temporal quanta or graticules. Notably, the conventional techniques require either preconfigured regions or preconfigured space-time graticules of preconfigured sizes, in order to determine relationships between physical entities based on motion processing.

However, preconfigured approaches have significant drawbacks. In geospatial graticules, for example, some conventional techniques apply geohash strings, of various lengths, to break down the planet's surface into regions whose size should be relevant to the motion of the entities to be analyzed. However, if the graticules are too big, then an over-large bunch of entities are encompassed by just one graticule, and analytics can become all-encompassing and useless. At the other extreme, if the graticules are too small, then an entity in motion may appear in a great many graticules in a short time span, and analytics becomes either incapable of finding matching graticules when identifiers for overly specific graticules fail to compare, or swamped with large amounts of detailed data, or both. Thus, when the preconfigured approach is deployed, care must be taken to choose an appropriate graticule size. That choice becomes a matter of guesswork that some thoughtful analytics itself could have eliminated.

SUMMARY

In an exemplary embodiment, the present invention can provide a computer-implemented motion processing analysis method, the method including selecting a first spatial graticule size, determining that a physical entity is associated with a first spatial graticule during a first timeframe and that the physical entity is associated with a second spatial graticule during a second timeframe, as a result of determining that the physical entity is associated with the first spatial graticule during the first timeframe and that the physical entity is associated with the second spatial graticule during the second timeframe, adding to a sum, determining that the sum is beyond an acceptable range, and as a result of determining that the sum beyond the acceptable range, selecting a second spatial graticule size. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
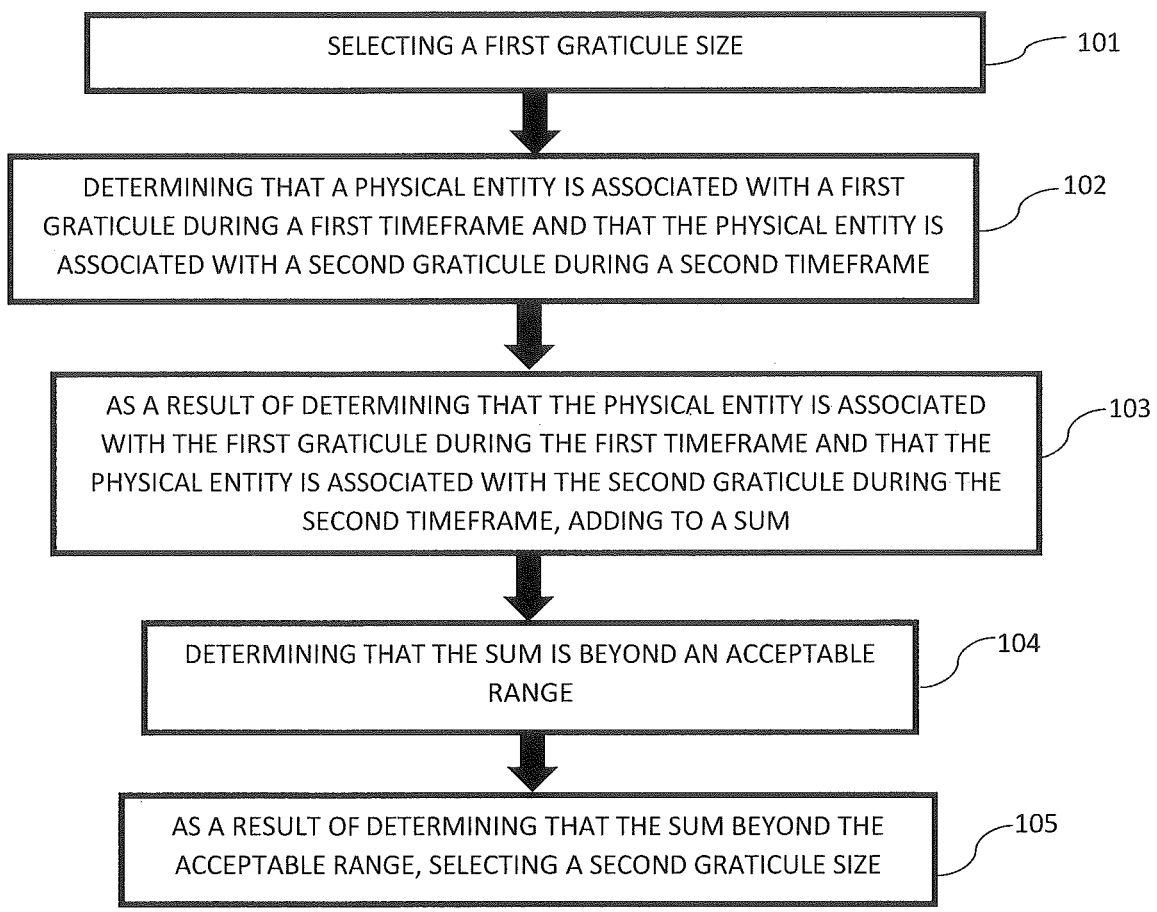
FIG. 1 exemplarily shows a high-level flow chart for a motion processing analysis method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a motion processing analytics method 100 according to the present invention can include various steps for determining a spatial or temporal graticule size (i.e., rather than a preconfigured size) for use by an entity analytics system, also known as an entity resolution engine. The entity resolution engine can resolve entities by attempting to match observed entities with previously observed entities. Entities such as ships may be matched based on comparison of their features, such as capacities or countries of origin, and feature elements, such as tonnages or cubic meters. The rules that drive the entity resolution engine can be derived from a few basic concepts concerning entity features. The concepts can include: the frequency of entities per their occurrence (e.g., "Can a ship have more than one actual capacity?" or "Can it have more than one crew member?"); the exclusivity of their occurrences per entity (e.g., "Can a given capacity apply to more than one ship?" or "How about a given vessel name?"); their stability over time (e.g., "Does a ship have one capacity during one timeframe and another capacity during another timeframe?" or "Can it have one captain this voyage and a different captain next voyage?"); and/or functional dependency (e.g. "If a first ship has a certain first capacity, must a second ship then have a certain second capacity?" or for a case where functional dependency may be more meaningful, "If a fleet has three ships on the water and three captains, and the first two captains are in charge of two of the ships, may it follow that the third captain is in charge of the other (or third) ship?"). The system can automate the process of deriving a useful set of entity resolution rules for a given use case and/or a changing scenario.

Figure 3:
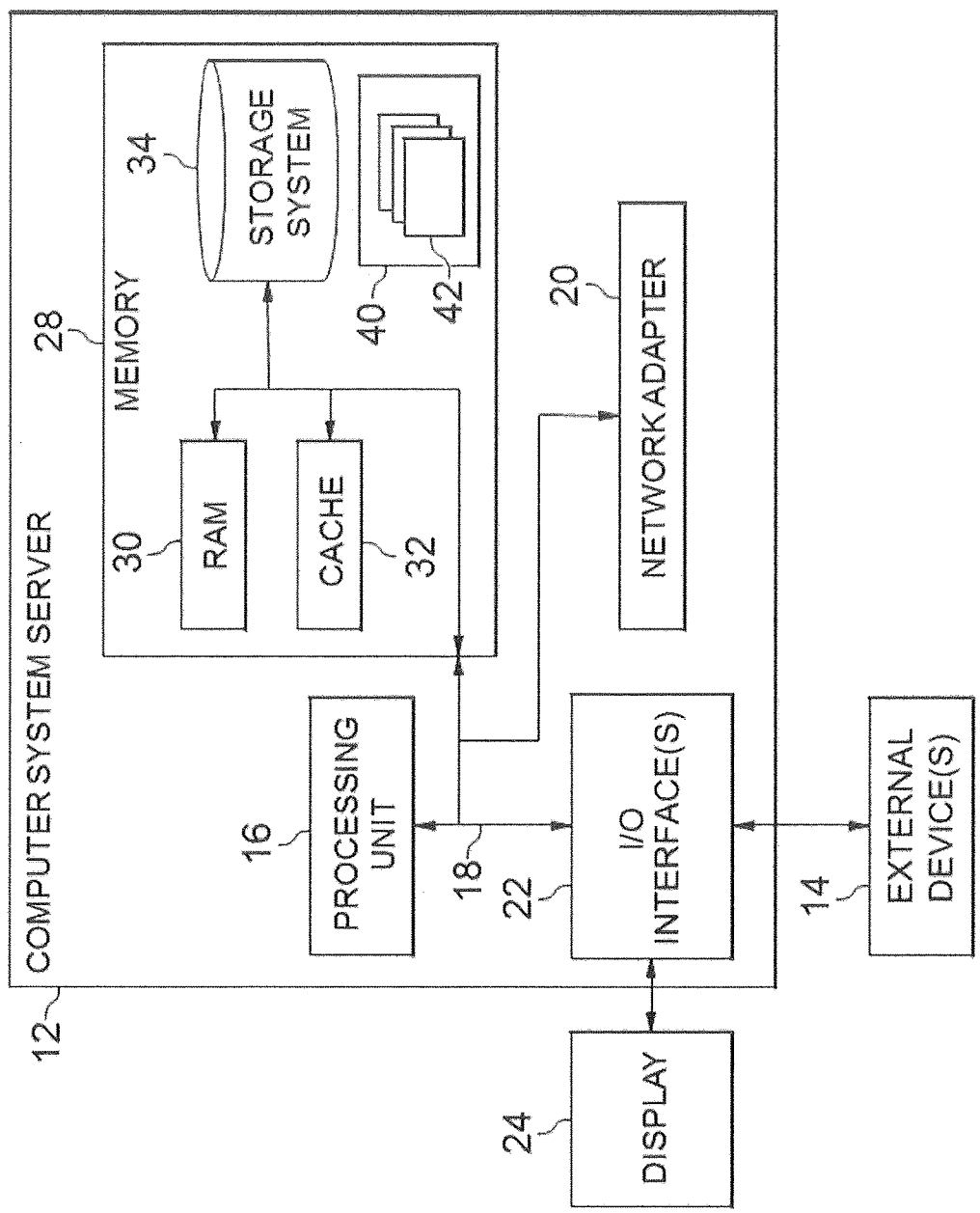
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Referring now generally to the embodiments of the invention, the invention can determine spatial or temporal graticule size, in the interest of best ensuring exclusivity of spatial, temporal, or spatiotemporal graticule occurrences per entity (e.g., "Can a given space-time box apply to more than one ship?") by, for example, (1) assuming a spatial graticule size and a fixed timeframe duration; (2) if a physical entity is observed in one spatial graticule during one timeframe and in another spatial graticule during the subsequent timeframe, increment a counter of spatial graticule changes; (3) if over a set of contiguous timeframes the counter is above an upper limit, increment the spatial graticule size; (4) otherwise, if the counter is below a lower limit, decrement the spatial graticule size; (5) if either counter has changed, go back to (2); and (6) return the range of spatial graticule sizes, or the median.

It is noted that the Wan "spatial graticule size" as used herein is synonymous with "spatial resolution" or "density". It is further noted that the spatial graticule and timeframe of the foregoing example might be exchanged, in embodiments, for a temporal graticule and spatial range, such that if over a set of contiguous spatial regions a counter of temporal graticule changes is above or below a limit, the temporal graticule size can be modified similarly to the spatial graticule of the foregoing example. In some embodiments, the graticule may take the form of a space-time box having both spatial and temporal components that can be adjusted independently or together in accordance with one or more counters, as described in the foregoing example, so as to maximize the exclusivity of graticule occurrences per entity.

If entities of different classes are to be compared based on their space-time coordinates, then a graticule size can be computed relevant to each of the entity classes, based on applying the above steps for entities of each class. The entities can then be compared with their own empirically surmised velocity ranges in mind. The above steps also can be performed, and established graticule sizes can be adjusted, any time when entities might change velocities.

Motion processing analytics that breaks down space and/ or time into graticules can determine the velocities of entities in order to autonomously select the best fitting of the graticules and/or graticule sizes. The inventive arrangements disclosed herein serve to determine graticule sizes based on empirical findings relative to a prospectively very large data set, rather than based on the preconceived notions, educated guesses, behavior modeling, trial and error, published specifications, or other non-empirical determinations of graticule sizes performed by the human users or administrators who configure the motion processing aspects of conventional entity analytics systems.

To empirically determine a spatial graticule size, the motion processing method of the present invention can receive configuration data including simply a timeframe length, and optionally a parameter indicating a highest possible spatial resolution or a smallest possible graticule size. A physical entity can be tracked as it moves, starting at the highest resolution. As incoming observations of the entity are processed from one timeframe to the next, any change in the entity's associated spatial graticule is denoted with a set flag. Flag values or flag setting conditions are added, over a number of timeframes, to produce a sum. If the sum is greater than a threshold, then the resolution is reduced and the method continues. Otherwise, the method may return the resolution or graticule size. The method may then end, or in some embodiments, it may continue over further iterations that may or may not run concurrently with other motion processing analytics that relies on the method's findings on an ongoing basis.

In another embodiment, the method starts at a lowest possible spatial resolution or a largest possible graticule size. It works its way from that extreme while the sum of graticule changes is less than a threshold value. Reaching the threshold can trigger the method to return a computed resolution or graticule size (i.e., as an immediate result, or responsive to convergence based on computation of a graticule size by starting at the opposite extreme and working toward a graticule size between the two extremes).

Both embodiments as described above may be run in parallel as "top-down" and "bottom-up" embodiments that might meet in the middle (i.e., converge). The graticule size may be determined based on their combined results, for example at the median of the two. Also, the embodiments need not run in the sequential order described but can sample a single set of observations simultaneously at different resolutions, to achieve a set of concurrent sums and determine, in short order, a graticule size reflecting a near-optimum spatial resolution.

The threshold values described herein represent an acceptable range of graticule sizes. Thresholds can be preconfigured, or they may be determined by the percentage of entities traversing in the most populous graticule of a set of graticules during any one timeframe. For example, the graticules can be set to be just big enough to differentiate among those entities and no bigger. The graticule sizes also may be determined by analyzing entities in motion. That is, if the entities' motion has never been observed to be very different from that of the entitles at present, or at the time when the observational data is sampled, then the threshold might (for example) be high enough to place entities at top speed in differing graticules at subsequent timeframes, and no higher. Still another way to arrive at a threshold is based on running the two parallel "top-down" and "bottom-up" embodiments meeting in the middle as described above. The middle then becomes the common threshold—and the graticule size is set in a "Goldilocks" manner (i.e., too big, adjust incrementally smaller and vice versa).

In some embodiments, a spatial resolution is given and a fitting time resolution is calculated using an iterative approach similar to the above, but where the time graticules vary until a threshold sum of movements between spatial zones, per timeframe, is reached. It is also possible to calculate fitting space and time graticule sizes at once, in parallel, using a similar technique. A median of best-fitting spatial resolutions might be combined with a median of best-fitting temporal resolutions to automatically determine useful resolutions for both space and time.

In the above embodiments, a single entity is considered, which will be of a size and velocity fitting for entities of its type or class. In other embodiments, if entities being tracked are of more than one class moving at very different rates, resolutions can be computed for select entities of each type, and a median can be used to encompass all relevant entities. In the alternative, different entities can be associated with different graticule sizes that can be compared, one graticule against just a portion of another, for entity relationship determination.

Figure 2A:
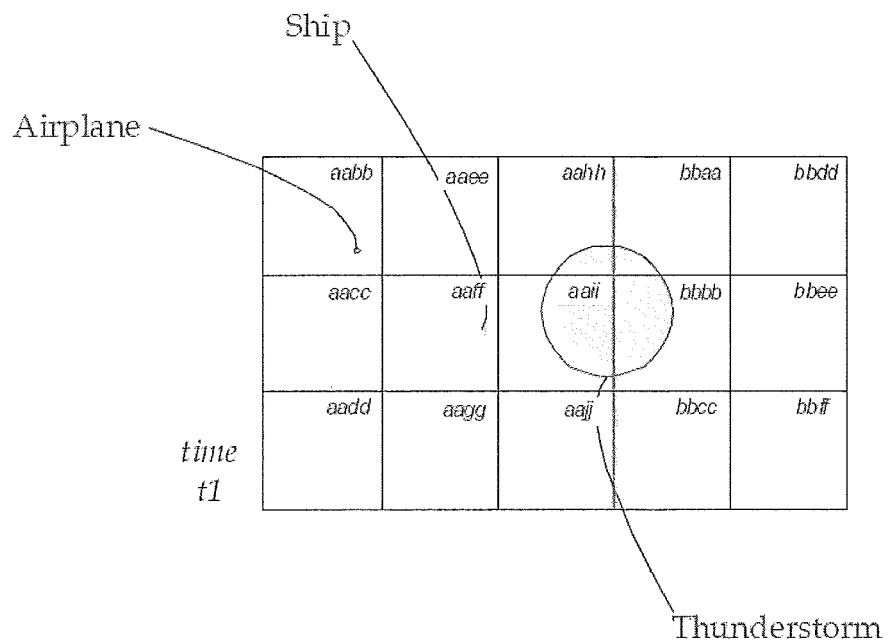
FIGS. 2A-2B exemplarily depicts spatial graticules at t1 and t2 according to an embodiment of the present invention.
Figure 2B:
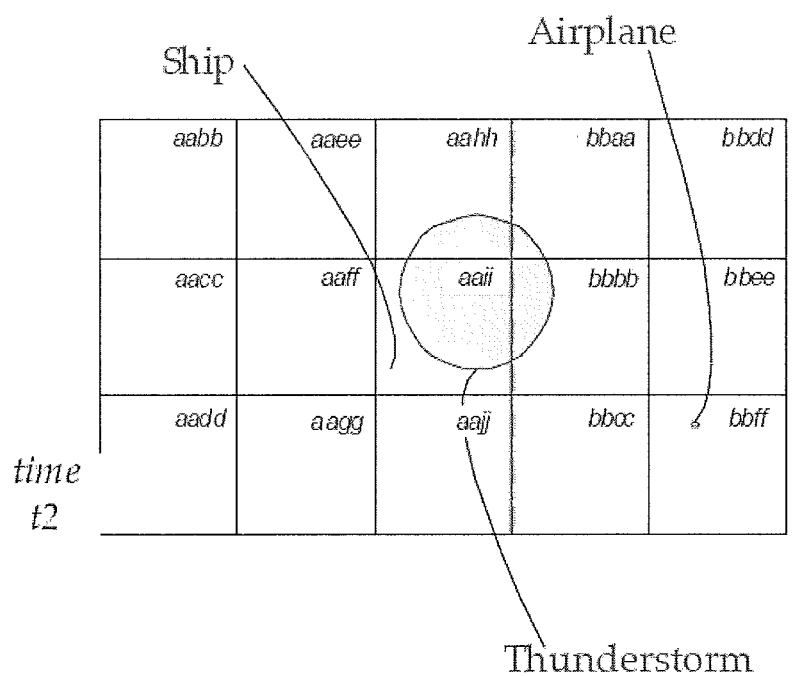

Referring to FIGS. 2A and 2B, a grid of 15 spatial graticules is provided in which is observed a thunderstorm, an airplane, and a ship at time t1. If the thunderstorm, airplane, and ship are observed again at time t2, then when the ship has reached the storm's very edge, the aircraft may have already passed through it. At time t1, an exact-match graticule comparison finds that the ship is not at or near enough to the edge of the thunderstorm to flag a storm condition likely to affect it. A match that includes larger or neighboring graticules calculated on the ship's present or historical velocity could find that the ship is at or near enough to the edge of the thunderstorm to flag a storm condition likely to affect it. For the aircraft, even larger graticules might effectively be applied.

With reference now to FIG. 1, in step 101, a first graticule size is selected.

In step 102, a determination is made that a physical entity (i.e., aircraft, ship, weather condition, etc.) is associated with a first graticule during a first timeframe and that the physical entity is associated with a second graticule during a second timeframe.

In step 103, as a result of determining that the physical entity is associated with the first graticule during the first timeframe and that the physical entity is associated with the second graticule during the second timeframe, the result is added to a sum.

In step 104, a determination is made as to whether the sum is beyond an acceptable range.

In step 105, as a result of determining that the sum is beyond the acceptable range, a second graticule size is selected.

In some embodiments, the acceptable range can be determined by the percentage of observed entities in a single graticule of the first size. The acceptable range can be determined by a historical analysis of entities in motion. The acceptable range can be determined by a separate application given differing initial conditions. Further, the sum can represent the minimum graticule size applicable to an entity class. Alternatively, the sum can represent the maximum graticule size applicable to an entity class. In other embodiments, the sum can represent a first graticule size applicable to a first entity class, and graticules of the first size can be compared with graticules of a second graticule size applicable to a second entity class.

The graticules, and in some embodiments their sizes, can be features or feature elements associated with entities and can be compared in accordance with conventional entity analytics techniques. In embodiments, the graticules and graticule sizes can be associated with the entities in ways other than as features or feature elements (e.g. by outboard logic that feeds results into an entity analytics system). Thus the invention can be implemented either entirely within a conventional entity analytics system that incorporates the inventive concepts disclosed herein, or in a system that analyzes motion processing via one or more processes that incorporate the invention via a component or module that is not built into a conventional entity analytics system.

The invention improves on both the accuracy and performance of motion processing as performed by, or in conjunction with, conventional entity analytics systems. With the conventional systems, rules applicable to entity resolution and entity relationship determination in the context of motion processing are developed via trial and error, educated guesses, modeling, or other non-empirical means, as are the sizes of any space and time graticules to which the rules are applied. Configuration of the conventional entity analytics systems for motion processing analytics is thus error-prone, and the performance of the conventional system is typically sub-optimal because of either the overhead of tracking and comparing extraneously precise graticule identifiers, or the overhead of improper entity resolutions and entity relationship determinations that must be rolled back and reattempted when an insufficiently precise preconfigured graticule size results in outcomes where disparate observed entities are incorrectly resolved (i.e. incorrectly determined to be identical entities). The invention improves the motion processing capabilities of entity analytics systems by programmatically determining, across a potentially millions or billions of observations, the spatial or temporal characteristics of entities in motion so as to determine, for any given class of entities, the appropriate graticule sizes for use in motion processing analytics.

The myriad entity classes that may be subject to entity analytics applied to the Internet of Things ("IoT") can comprise a range of physical entities (i.e., real-world objects) far beyond the exemplary aircraft, ship, and thunderstorm of FIGS. 2A and 2B. Entities in the IoT landscape can include entities much larger, much smaller, much faster, much slower, and/or of otherwise much more widely variable behaviors than the entities of the exemplary classes as described in conjunction with FIGS. 2A and 2B. The invention makes entity resolution and entity relationship determination involving entities in the IoT landscape possible without requiring configuration guesswork involving every possible entity class in the IoT landscape to which entity analytics may be applied. Further, once an embodiment determines an appropriate graticule size for a given entity class, that graticule size may be sharable from one system to another. In reliance on the invention, the vendor of an entity analytics system can provide a customer using the entity analytics system with an empirically predetermined space or time graticule size appropriate to each entity class within a preconfigured set of entity classes relevant to the customer's use cases for the entity analytics system. Thus, the invention can enable relatively straightforward adoption of the entity analytics system for motion processing analytics, relieving significant difficulties typically encountered when a conventional entity analytics system is rolled out in a real-world motion processing context.

Entity resolution involving physical entities in motion are typically performed by programmatically comparing spatial and/or temporal graticules in which the entities are observed, where prior to the comparison the graticules typically are programmatically associated with entity features or feature elements, and where the comparison is programmatically performed according to predetermined rules applicable to motion processing. The invention can determine a graticule size, also programmatically, such that the user/operator need not configure a graticule size, thus opening entity resolution to broad possibilities for identifying and comparing entities that move at various or changing rates. This form of entity resolution can be done via entity analytics techniques or via further techniques made possible by the invention.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
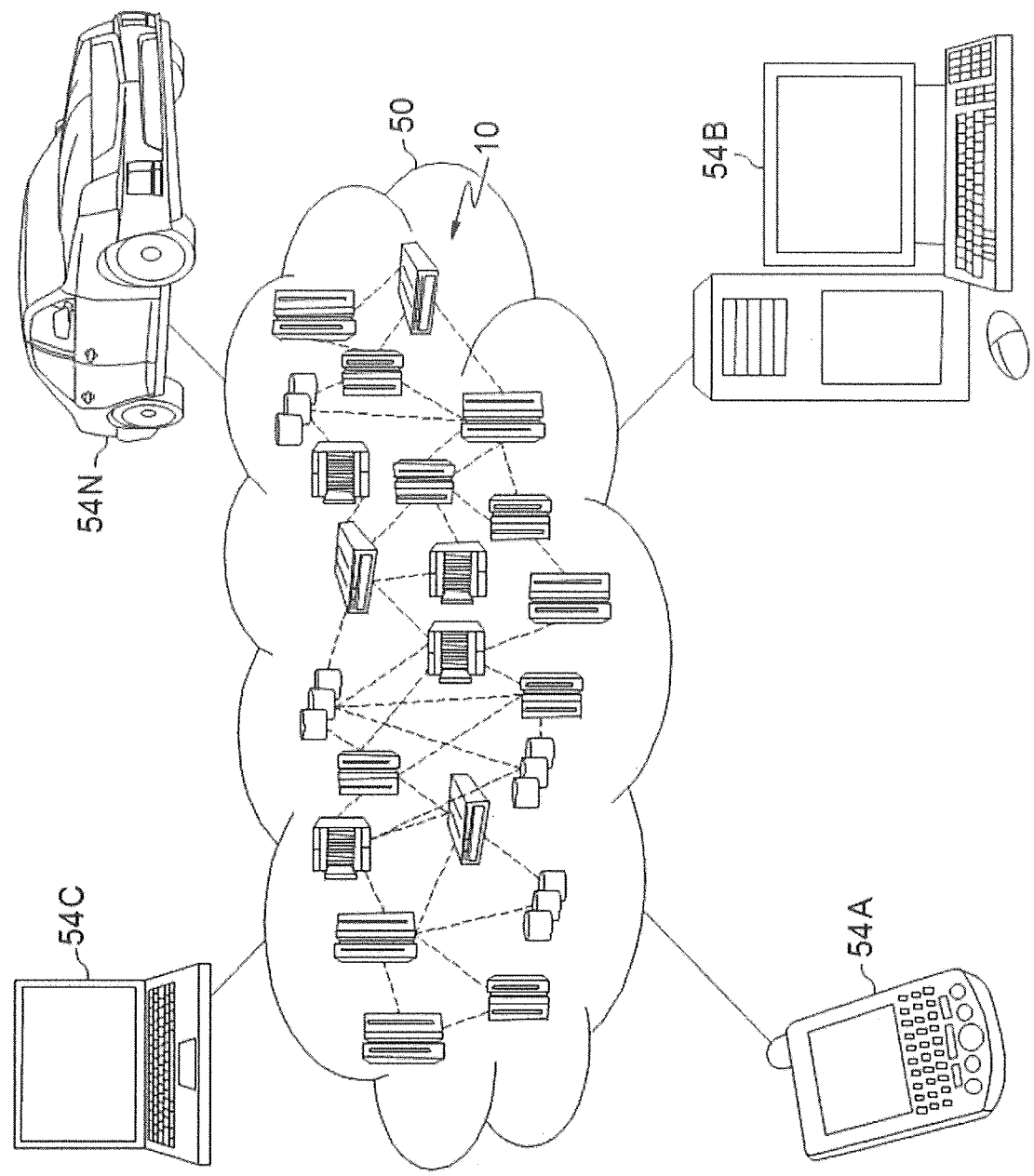
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
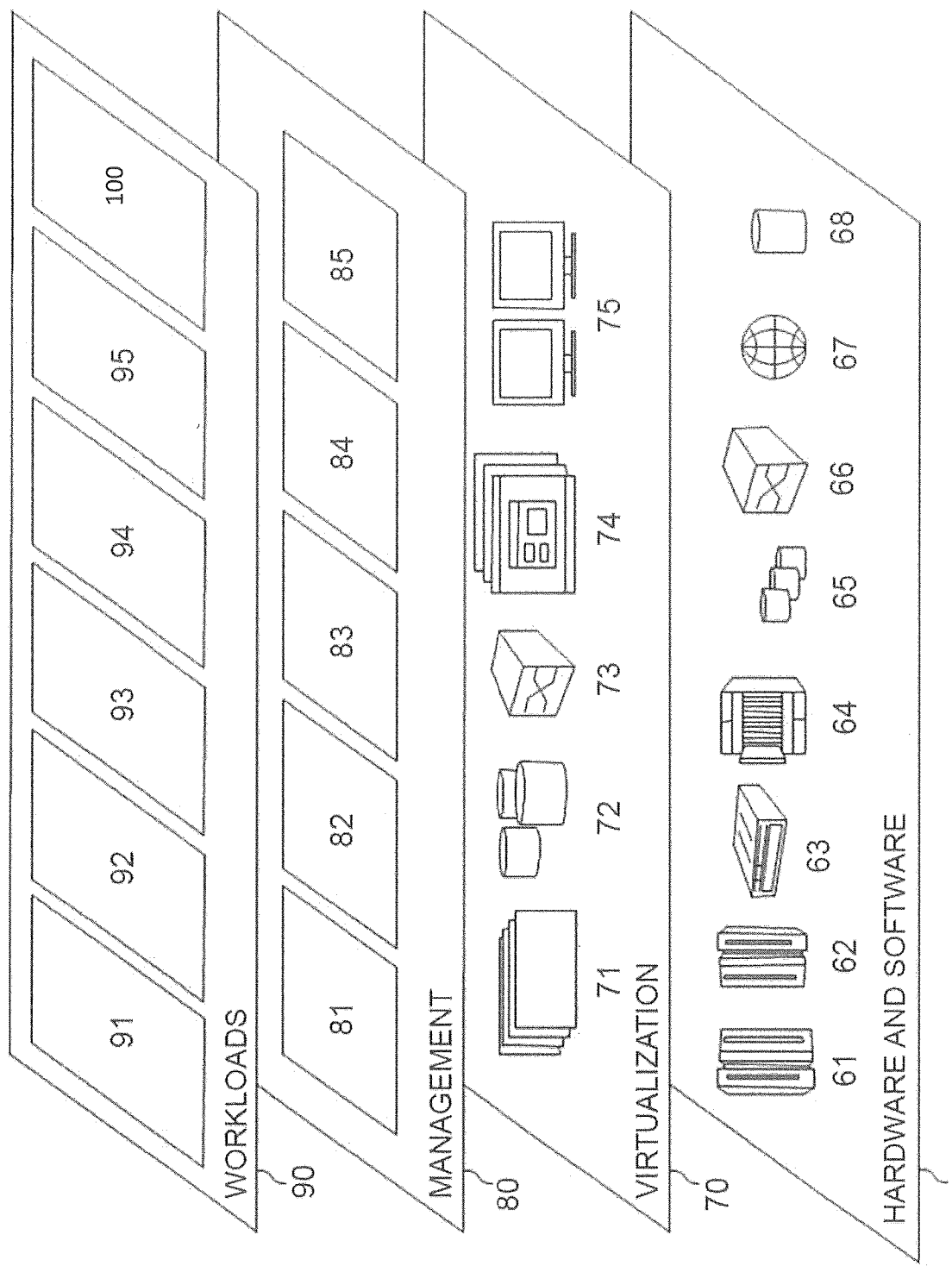
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and motion processing analysis method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented motion processing analysis method, the method comprising:
    determining a first spatial graticule size and a fixed timeframe duration relevant to a physical entity of a first entity class by a processor that resolves entities by matching observed entities with previously observed entities, the processor automating a process of deriving a set of rules for the entity resolution in order to enable the determining of the first spatial graticule size;
    determining that the physical entity is associated with a first spatial graticule during a first timeframe and that the physical entity is associated with a second spatial graticule during a second timeframe;
    as a result of determining that the physical entity is associated with the first spatial graticule during the first timeframe and that the physical entity is associated with the second spatial graticule during the second timeframe, adding the first spatial graticule to the second spatial graticule to produce a sum;
    determining that the sum is beyond an acceptable range;
    as a result of determining that the sum beyond the acceptable range, determining a second spatial graticule size; and
    comparing the physical entity with a second physical entity of a second entity class,
    wherein the first spatial graticule size is empirically determined by:
        a first process to determine a first value for the first spatial graticule size by tracking the physical entity as it moves, starting at a highest resolution, and as incoming observations of the physical entity are processed from one timeframe to a next timeframe, a change in the entity's associated spatial graticule is denoted with a set flag, the flag setting conditions are added over a number of timeframes to produce the sum, and if the sum is greater than the acceptable range, then the resolution is reduced and the first process is repeated;
        a second process to determine a second value for the first spatial graticule size by starting at a lowest possible spatial resolution or a largest possible graticule size, working in an opposite resolution direction while the sum of graticule changes is less than the acceptable range and returning the second value for the first spatial graticule size when the acceptable range is reached; and
        outputting a result for the first spatial graticule size by taking a median of the first value and the second value.

2. The computer-implemented method of claim 1, wherein the acceptable range is determined by a percentage of physical entities in a single graticule of the first spatial graticule size, and
    wherein the determining the first spatial graticule size and the determining the second spatial graticule size is performed without trial and error.

3. The computer-implemented method of claim 1, wherein the acceptable range is determined by a historical analysis of physical entities in motion.

4. The computer-implemented method of claim 1, wherein the acceptable range is determined by a separate application given differing initial conditions.

5. The computer-implemented method of claim 1, wherein the sum represents a minimum spatial graticule size applicable to entities of an entity class.

6. The computer-implemented method of claim 1, wherein the sum represents a maximum spatial graticule size applicable to entities of an entity class.

7. The computer-implemented method of claim 1, wherein the sum represents the first graticule size applicable to entities of a first entity class, and
wherein spatial graticules of the first spatial graticule size are comparable with spatial graticules of a second spatial graticule size applicable to entities of a second entity class.

8. The computer-implemented method of claim 1, embodied in a cloud-computing environment.

9. A computer program product for motion processing analysis, the computer program product comprising a computer-readable storage medium having program instructions embodied therewith, the program instructions executable by a computer to cause the computer to perform:
determining a first spatial graticule size and a fixed timeframe duration relevant to a physical entity of a first entity class by a processor that resolves entities by matching observed entities with previously observed entities, the processor automating a process of deriving a set of rules for the entity resolution in order to enable the determining of the first spatial graticule size;
determining that the physical entity is associated with a first spatial graticule during a first timeframe and that the physical entity is associated with a second spatial graticule during a second timeframe;
as a result of determining that the physical entity is associated with the first spatial graticule during the first timeframe and that the physical entity is associated with the second spatial graticule during the second timeframe, adding the first spatial graticule to the second spatial graticule to produce a sum;
determining that the sum is beyond an acceptable range;
as a result of determining that the sum beyond the acceptable range, determining a second spatial graticule size; and
comparing the physical entity with a second physical entity of a second entity class,
wherein the first spatial graticule size is empirically determined by:
a first process to determine a first value for the first spatial graticule size by tracking the physical entity as it moves, starting at a highest resolution, and as incoming observations of the physical entity are processed from one timeframe to a next timeframe, a change in the entity's associated spatial graticule is denoted with a set flag, the flag setting conditions are added over a number of timeframes to produce the sum, and if the sum is greater than the acceptable range, then the resolution is reduced and the first process is repeated;
a second process to determine a second value for the first spatial graticule size by starting at a lowest possible spatial resolution or a largest possible graticule size, working in an opposite resolution direction while the sum of graticule changes is less than the acceptable range and returning the second value for the first spatial graticule size when the acceptable range is reached; and
outputting a result for the first spatial graticule size by taking a median of the first value and the second value.

10. The computer program product of claim 9, wherein the acceptable range is determined by the percentage of physical entities in a single spatial graticule of the first spatial graticule size.

11. The computer program product of claim 9, wherein the acceptable range is determined by a historical analysis of physical entities in motion.

12. The computer program product of claim 9, wherein the acceptable range is determined by a separate application given differing initial conditions.

13. The computer program product of claim 9, wherein the sum represents a minimum spatial graticule size applicable to entities of an entity class.

14. The computer program product of claim 9, wherein the sum represents a maximum spatial graticule size applicable to entities of an entity class.

15. The computer program product of claim 9, wherein the sum represents the first spatial graticule size applicable to entities of a first entity class, and
wherein spatial graticules of the first spatial graticule size are comparable with spatial graticules of a second spatial graticule size applicable to entities of a second entity class.

16. A motion processing analysis system, said system comprising:
a processor; and
a memory, the memory storing instructions to cause the processor to perform:
determining a first spatial graticule size and a fixed timeframe duration relevant to a physical entity of a first entity class by the processor that resolves entities by matching observed entities with previously observed entities, the processor automating a process of deriving a set of rules for the entity resolution in order to enable the determining of the first spatial graticule size;
determining that the physical entity is associated with a first spatial graticule during a first timeframe and that the physical entity is associated with a second spatial graticule during a second timeframe;
as a result of determining that the physical entity is associated with the first spatial graticule during the first timeframe and that the physical entity is associated with the second spatial graticule during the second timeframe, adding the first spatial graticule to the second spatial graticule to produce a sum;
determining that the sum is beyond an acceptable range;
as a result of determining that the sum beyond the acceptable range, determining a second spatial graticule size; and
comparing the physical entity with a second physical entity of a second entity class,
wherein the first spatial graticule size is empirically determined by:
a first process to determine a first value for the first spatial graticule size by tracking the physical entity as it moves, starting at a highest resolution, and as incoming observations of the physical entity are processed from one timeframe to a next timeframe, a change in the entity's associated spatial graticule is denoted with a set flag, the flag setting conditions are added over a number of timeframes to produce the sum, and if the sum is greater than the acceptable range, then the resolution is reduced and the first process is repeated;

a second process to determine a second value for the first spatial graticule size by starting at a lowest possible spatial resolution or a largest possible graticule size, working in an opposite resolution direction while the sum of graticule changes is less than the acceptable range and returning the second value for the first spatial graticule size when the acceptable range is reached; and outputting a result for the first spatial graticule size by taking a median of the first value and the second value.

17. The system of claim 16, wherein the acceptable range is determined by a percentage of physical entities in a single spatial graticule of the first spatial graticule size.

18. The system of claim 16, wherein the acceptable range is determined by a historical analysis of physical entities in motion.

19. The system of claim 16, embodied in a cloud-computing environment.

20. The system of claim 16, wherein the first spatial graticule size is empirically determined by simultaneously performing both the first and second processes, and then performing the outputting the result based on the simultaneously performed first and second processes.

* * * * *